(12) United States Patent
Nordin et al.

(10) Patent No.: US 9,916,259 B1
(45) Date of Patent: Mar. 13, 2018

(54) SYSTEM AND METHOD FOR LOW LATENCY COMMUNICATION

(71) Applicant: Waymo LLC, Mountain View, CA (US)

(72) Inventors: Grace Nordin, Mountain View, CA (US); Daniel Rosenband, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 133 days.

(21) Appl. No.: 15/007,944

(22) Filed: Jan. 27, 2016

Related U.S. Application Data

(60) Provisional application No. 62/110,968, filed on Feb. 2, 2015.

(51) Int. Cl.
*G06F 12/12* (2016.01)
*G06F 12/121* (2016.01)
*G06F 12/0891* (2016.01)

(52) U.S. Cl.
CPC ........ *G06F 12/121* (2013.01); *G06F 12/0891* (2013.01); *G06F 2212/69* (2013.01)

(58) Field of Classification Search
CPC ............................ G06F 12/121; G06F 12/0891
See application file for complete search history.

(56) References Cited

U.S. PATENT DOCUMENTS

| | | | |
|---|---|---|---|
| 7,814,279 B2 | 10/2010 | Clark et al. | |
| 2006/0101209 A1* | 5/2006 | Lais | G06F 12/082 711/137 |
| 2011/0161620 A1* | 6/2011 | Kaminski | G06F 12/1009 711/207 |
| 2011/0289179 A1* | 11/2011 | Pekcan | H04L 49/65 709/213 |
| 2012/0239904 A1* | 9/2012 | Ekanadham | G06F 9/30043 711/207 |
| 2013/0346714 A1* | 12/2013 | Solihin | G06F 12/16 711/162 |
| 2015/0269074 A1* | 9/2015 | Shah | G06F 12/084 711/130 |

(Continued)

OTHER PUBLICATIONS

Bruce Wile, Coherent Accelerator Processor Interface (CAPI) for POWER8 Systems, IBM, Sep. 29, 2014.*

*Primary Examiner* — Ryan Bertram
(74) *Attorney, Agent, or Firm* — McDonnell Boehnen Hulbert & Berghoff LLP

(57) ABSTRACT

A system and method for low latency and higher bandwidth communication between a central processing unit (CPU) and an accelerator is disclosed. When the CPU updates a copy of data stored at a shared memory, the CPU also sends an "invalidate" command to a cache coherent interconnect (CCI). The CCI forwards the invalidate command to a dedicated cache register (DCR). The DCR marks its copy of the data as "out-of-date" and requests an up-to-date copy of the data from the CCI. The CCI then retrieves up-to-date data for the DCR. When the DCR receives the up-to-date data from the CCI, the DCR replaces the out-of-date data with the up-to-date data, and marks the up-to-date data with the status of "valid." The DCR can then provide data to an accelerator with a status of "out-of-date" or "valid."

21 Claims, 4 Drawing Sheets

(56) References Cited

U.S. PATENT DOCUMENTS

2015/0317275 A1* 11/2015 Arroyo ............... G06F 9/45558
710/105
2015/0331794 A1* 11/2015 Ren ........................ G06F 17/30
709/214

* cited by examiner

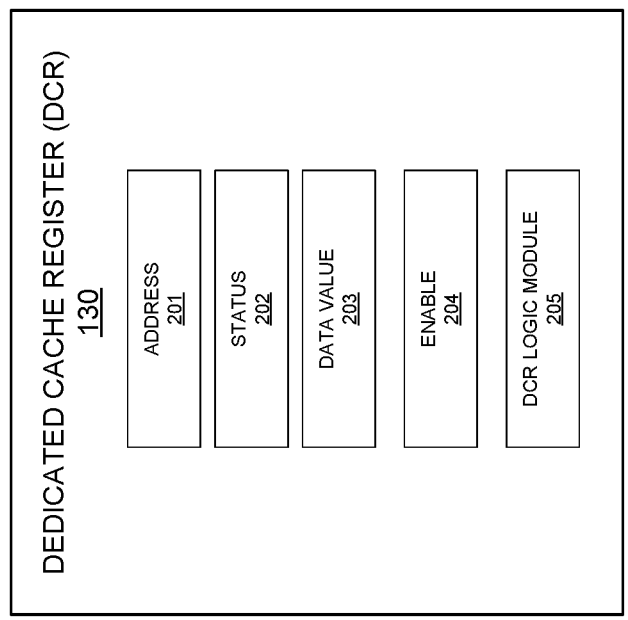

SYSTEM AND METHOD FOR LOW LATENCY COMMUNICATION

CROSS-REFERENCE TO RELATED APPLICATIONS

This patent application claims priority to U.S. Provisional Application No. 62/110,968, filed on Feb. 2, 2015, the contents of which are entirely incorporated herein by reference, as if fully set forth in this application.

BACKGROUND

In recent years, the growth of software applications has led to user demand for increased performance and computing power of computing devices, including mobile phones, laptops, tablets, wearable computing devices, desktops, servers, and/or other computing devices. The demand for increased computing power has led to the development of various techniques for enhancing central processing unit (CPU) performance.

Implementing hardware accelerators is one method for improving CPU performance. A hardware accelerator is designed to perform a specific task or function that the CPU normally handles. Typically, the hardware accelerator can perform the task faster than the CPU. Thus, when the CPU is requested to perform the task, the CPU can instead allocate the task to the hardware accelerator. This improves CPU performance in two ways. First, the hardware accelerator executes the task faster than the CPU. Second, because the hardware accelerator performs the task, the CPU is now available to perform a different task in parallel. Thus, hardware accelerators can enhance the performance and computing power of the CPU, and in turn, corresponding computing devices.

SUMMARY

In a first aspect, a method including receiving an indication from a cache coherent interconnect (CCI) that a copy of shared data is out-of-date; marking the shared data copy as out-of-date; sending a request for an up-to-date copy of the shared data; receiving the up-to-date copy of the shared data; replacing the out-of-date copy of the shared data with the up-to-date copy of the shared data; marking the replacement up-to-date shared data copy as valid; and providing the shared data to an accelerator.

In a second aspect, a system including a central processing unit (CPU) configured to generate an indication that a copy of shared data is out-of-date; a cache coherent interconnect (CCI) configured to receive the indication; an accelerator; and a dedicated cache register (DCR), the DCR including a non-transitory data storage configured to store a copy of the shared data; and a logic module comprising circuitry that causes the DCR to perform operations including receiving the indication from the CCI that the copy of shared data is out-of-date; marking the shared data copy as out-of-date; sending a request for an up-to-date copy of the shared data; receiving the up-to-date copy of the shared data; replacing the out-of-date copy of the shared data with the up-to-date copy of the shared data; marking the replacement up-to-date shared data copy as valid; and providing the shared data to the accelerator.

In a third aspect, a computing device including one or more processors; and a memory storing executable instructions, wherein executing the instructions causes the one or more processors to execute a method including receiving an indication from a cache coherent interconnect (CCI) that a copy of shared data is out-of-date; marking the shared data copy as out-of-date; sending a request for an up-to-date copy of the shared data; receiving the up-to-date copy of the shared data; replacing the out-of-date copy of the shared data with the up-to-date copy of the shared data; marking the replacement up-to-date shared data copy as valid; and providing the shared data to the accelerator.

In a fourth aspect, a dedicated cache register (DCR) that continuously provides up-to-date shared data to an accelerator including shared data; and a logic module comprising instructions that when executed cause the DCR to execute a method including determining that the shared data is not up-to-date; retrieving up-to-date shared data; and providing the up-to-date shared data to an accelerator.

These, as well as other aspects, alternatives, and advantages, will become apparent to those of ordinary skill in the art by reading the following detailed description, with reference where appropriate to the accompanying drawings.

BRIEF DESCRIPTION OF THE DRAWINGS

FIG. 2 illustrates an example block diagram of a dedicated cache register (DCR).

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. OVERVIEW

Hardware accelerators can be used to improve CPU and computing device performance. Lately, hardware accelerators have taken the form of on-chip blocks, as opposed to discrete chips (e.g., graphic processing unit (GPU)). With this transition towards a shared memory-based communication, opportunities exist to provide communication between CPUs and accelerators with lower latency and higher bandwidth. Lower latency and higher bandwidth communication can in turn enhance CPU and computing device performance.

Enhanced performance can be shown for the example where the CPU executes software that updates a command queue pointer. When the CPU updates the command queue pointer, the change by the CPU is eventually seen by the accelerator. When the accelerator sees the updated command queue pointer, the accelerator can start performing the appropriate work. The sooner the accelerator sees the updated command queue pointer, the sooner the accelerator can begin performing the work. Thus, a lower latency and higher bandwidth communication between the CPU and accelerator can enable the accelerator to begin performing work sooner. As a result, performance of the CPU and computing device can be improved by the lower latency and higher bandwidth communication between the CPU and accelerator.

II. SYSTEM OVERVIEW

Figure 1A:
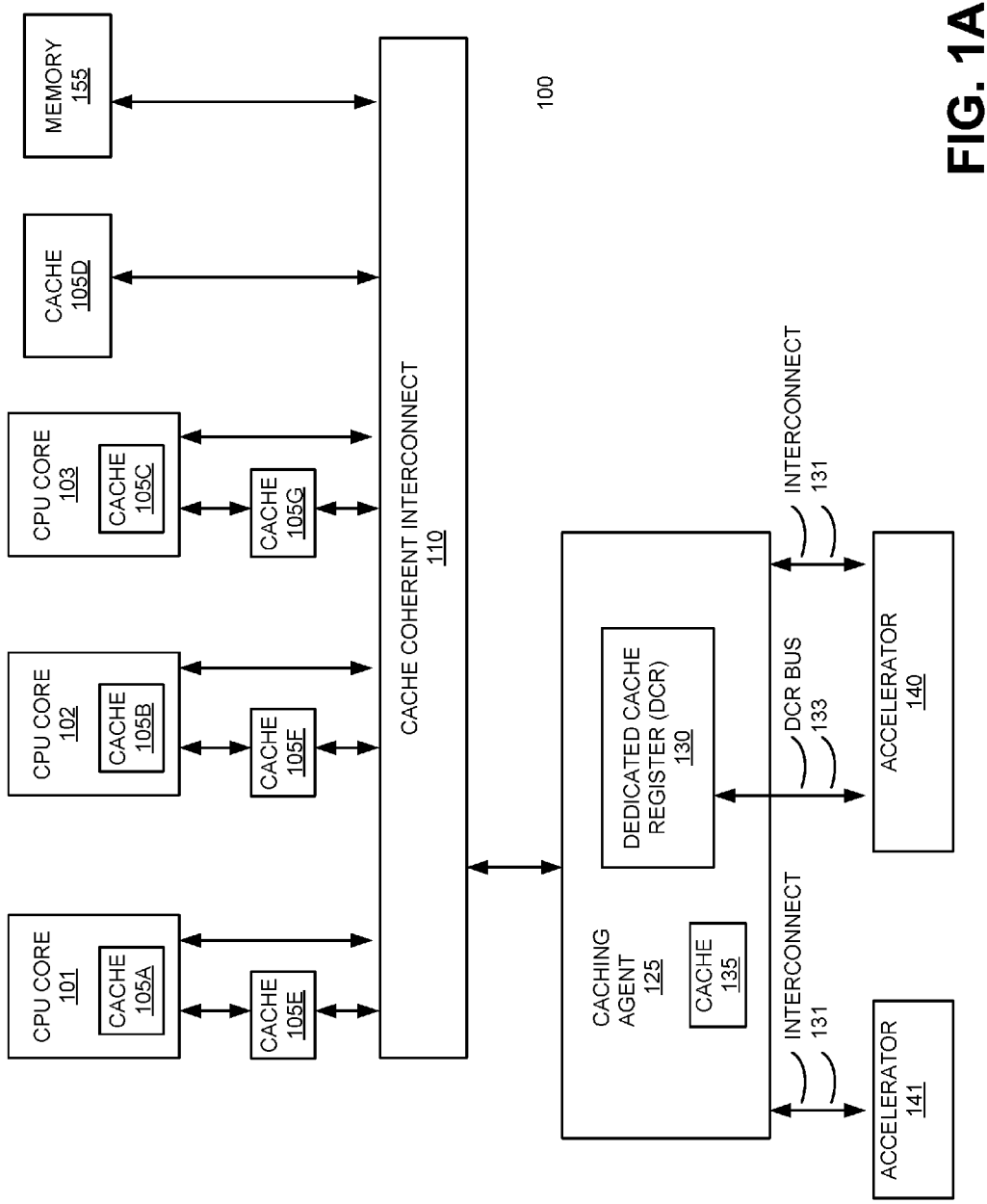
FIG. 1A illustrates an example block diagram of a low latency CPU accelerator communication environment.
Figure 1B:
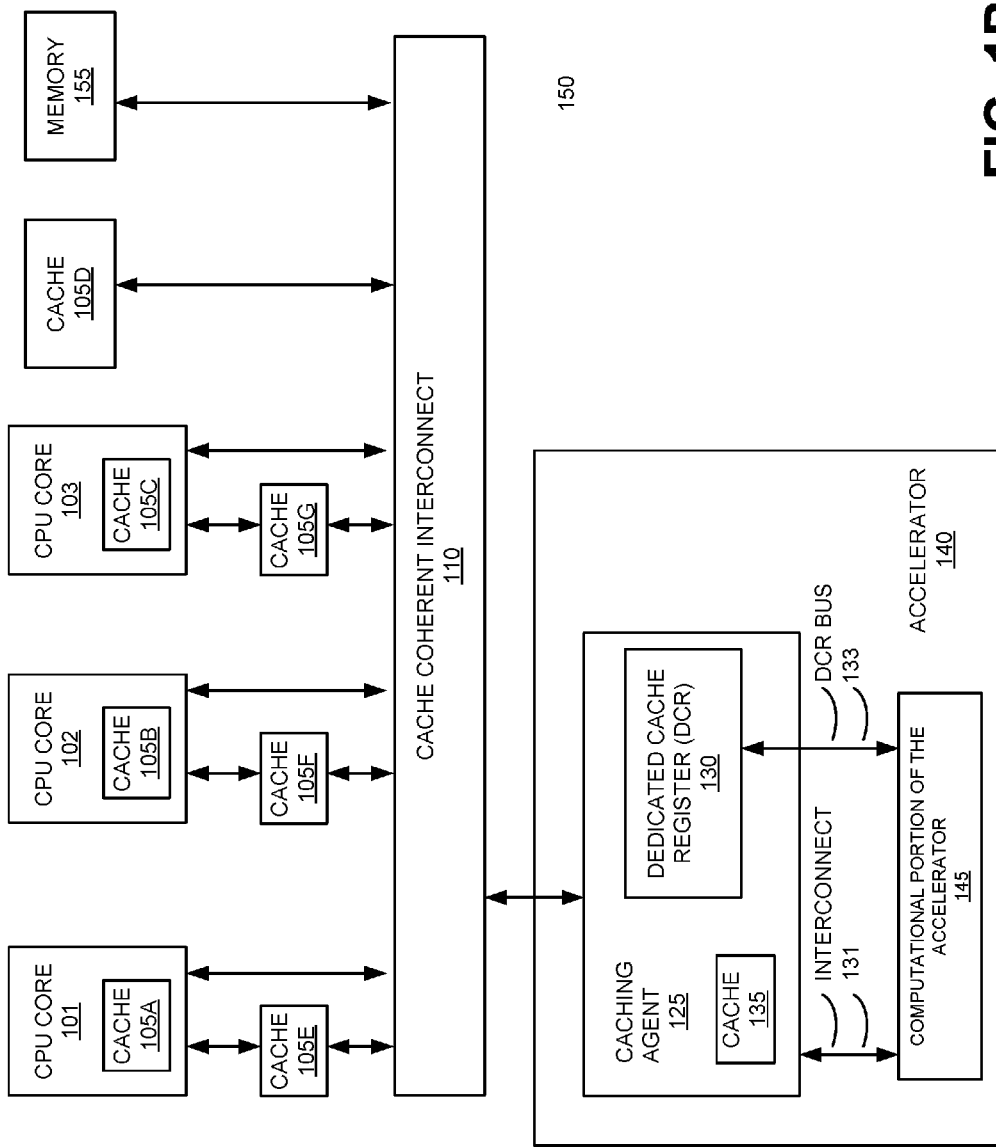
FIG. 1B illustrates an example block diagram of a low latency CPU accelerator communication environment.

FIG. 1A illustrates an embodiment of a low latency CPU accelerator communication environment 100. FIG. 1B illustrates a different embodiment of a low latency CPU accelerator communication environment 150. Each environment displays the components of a system that provides a low latency and higher bandwidth communication between a CPU and an accelerator. Both environments 100 and 150 include CPU core 101, CPU core 102, CPU core 103, caches 105A-G, memory 155, cache coherent interconnect (CCI) 110, caching agent 125, cache 135, dedicated cache register (DCR) 130, interconnect 131, DCR bus 133, and accelerator 140. Additionally, environment 100 also includes accelerator 141. Environment 150 also displays computational portion of the accelerator 145. In some embodiments, the environments 100 and 150 may include more, fewer, and/or different components than those displayed in FIGS. 1A and 1B. For example, the low latency CPU accelerator communication system and method may be implemented without one or more of memory 155, caches 105A-G, and/or other components displayed in FIGS. 1A and 1B. Additionally, in some embodiments, the components of environments 100 and 150 may communicate or be arranged differently from what is shown in FIGS. 1A and 1B.

For FIGS. 1A and 1B, CPU cores 101, 102, and 103 may be part of one multicore CPU. The CPU may execute a set of instructions for one or more software programs. The instructions may call for the CPU to execute multiple tasks, including tasks that the CPU can allocate to a hardware accelerator. Although the CPU could handle the task, assigning the task to a hardware accelerator improves the performance of the CPU and the computing device.

For the disclosed method, the CPU executes a task that is reflected at one or more accelerators 140 and/or 141. In one embodiment, the CPU may update a data value stored in memory 155. The CPU may then notify the caching agent 125 via CCI 110 that the CPU updated the value. In particular, each core (101, 102, and/or 103) of the multicore CPU may execute the task or instruction, update the data value stored in memory 155, and/or notify the caching agent 125 via CCI 110 about the changed value. Alternatively, multiple CPU cores may work together to notify the caching agent 125 about an updated value in memory 155. For example CPU core 101 may update the value at memory 155 while CPU core 102 notifies the caching agent 125 via CCI 110 about the updated value. Other methods for splitting the functions of the CPU amongst the multiple cores of the CPU are also possible.

The CPU is connected to CCI 110 via each of its cores, including cores 101, 102, and 103. In some embodiments, the CPU may have all cores connected to the CCI. In other embodiments, only a portion of the cores of the CPU are connected to the CCI. Thus, when the CPU updates data at memory 155, or caches 105A-G, the CPU provides the updated data, the particular data storage destination (e.g., caches 105A-G and/or memory 155), a hardware address for the particular memory, and/or other relevant parameters to CCI 110. Additionally, the CPU via its cores 101, 102, and/or 103 may communicate with caching agent 125 via CCI 110. For example, the CPU cores 101, 102, and 103 may inform caching agent 125 about updated data by sending CCI 110 an "invalidate" command for the updated data to comply with various cache coherence protocols (e.g., MOESI protocols). In some embodiments, the CPU cores 101, 102, and 103 may provide different data to CCI 110 to communicate with components of the system displayed in environments 100 or 150 (e.g., caching agent 125, DCR 130, accelerators 140, 141, accelerator portion 145, or other components).

In the displayed embodiment of FIGS. 1A and 1B, three CPU cores, 101, 102, and 103 are displayed for one CPU. In other embodiments, more than one CPU may communicate with CCI 110. In some embodiments, a CPU may include more or fewer cores than the three cores displayed in FIGS. 1A and 1B. In some embodiments, a CPU may include a single core. In some embodiments, the CPU may have all cores communicating with CCI 110, while in other embodiments, the CPU may only have a portion of their cores communicating with CCI 110. The systems in environments 100 and 150 may accommodate a generic single core or multicore CPU capable of communicating with CCI 110 and the one or more accelerators 140 and/or 141. Thus, a custom CPU is not required for the system of FIG. 1A or 1B to be implemented. Additionally, the systems displayed in environments 100 and 150 could be configured for multiple CPUs to communicate with multiple accelerators and/or accelerator portions via CCI 110.

Caches 105A-G may be a local cache available to the CPU cores 101, 102, and/or 103 as a quicker alternative for reading and/or writing data than memory 155. Alternatively, caches 105A-G may be dedicated to other hardware that interacts with the CPU and/or interacts with caches 105A-G. Caches 105A-G are connected to CCI 110. CCI 110 may verify that data written to or read from caches 105A-G is cache coherent (i.e., consistent) with respect to stored data at other data storage devices (e.g., memory 155, caches 105A-G, cache 135, DCR 130, other data storage devices).

Various configurations of caches 105A-G are possible. For example, while FIGS. 1A and 1B show each CPU core 101-103 having a corresponding local cache 105A-C, in some embodiments, caches 105A-C a be consolidated to one cache serving all three CPU cores 101-103. Alternatively, caches 105A-C may be eliminated. Similarly, caches 105E-G may be consolidated and/or eliminated. Additionally, cache 105D may be eliminated or additional caches 105D may be added, depending on the needs of the systems of environments 100 and 150. Thus, environments 100 and 150 may not include one or more of caches 105A-G. Alternatively, the environments 100 and 150 may include more caches than just caches 105A-G.

Memory 155 is a shared memory that can be used by various hardware devices, such as a CPU and CPU cores 101, 102, and 103. In one embodiment, the memory 155 is a dynamic random access memory (DRAM). However, memory 155 could be a different type of memory. Memory 155 includes physical addresses at which data values can be stored. Memory 155 is coupled to CCI 110 for data transmission. In particular, a device can connect to CCI 110 to read from or write to the memory 155. CCI 110 may verify that data written to or read from memory 155 is cache coherent with data at other data storage devices (e.g., caches 105A-G, cache 135, DCR 130, other data storage devices). In other embodiments, memory 155 may be connected to the system using other mechanisms to provide data to other hardware and/or software components.

CCI 110 enables data communication between various hardware and software components while providing that data transmitted remains consistent with data at other data storage devices, and thus cache coherent. CCI 110 is connected to the CPU cores 101, 102, and 103, cache 105D-G, and memory 155, as well as caching agent 125, and possibly accelerator 140 (see FIG. 1B). CCI 110 can receive a command to fetch up-to-date data. In response, CCI 110 may retrieve up-to-date data from a data storage device, such as memory 155. The CCI 110 may then provide the retrieved data to the hardware or software that requested it.

Specifically, in the embodiments displayed in FIGS. 1A and 1B, CCI 110 may help a CPU via CPU cores 101, 102, and/or 103 update a data value at memory 155. In response to this update, CCI 110 sends an "invalidate" command to caching agent 125 for DCR 130. Following the "invalidate" command, CCI 110 receives a "read to share" request from DCR 130. In response to the "read to share" request, CCI 110 may fetch up-to-date data and send it back to DCR 130 via caching agent 125.

In other embodiments, CCI 110 may provide different data communication services than those described above. In other embodiments, CCI 110 may be connected to more, fewer, and/or different components of the system.

FIGS. 1A and 1B also display caching agent 125 as part of environments 100 and 150. In FIGS. 1A and 1B, caching agent 125 includes DCR 130 and cache 135. However, in other embodiments, caching agent 125 may include other data storage devices. Caching agent 125 may be software executed to manage interactions between data storage devices (e.g., cache 135 and DCR 130) and other hardware, such as CCI 110, accelerators 140, 141, CPU cores 101, 102, 103, memory 155, and/or other hardware.

CCI 110 and caching agent 125 can interact in several ways. Caching agent 125 can receive data, such as up-to-date data values for storage at DCR 130, from CCI 110. The data may be retrieved from memory 155, caches 105A-G, or some other data storage device. Caching agent 125 can also receive commands from CCI 110, such as an "invalidate" command for data stored at DCR 130, which indicates that the stored data value is "out-of-date". Caching agent 125 can also provide data requests to CCI 110, such as a "read to share" command. Caching agent 125 can interact with accelerators 140, 141, and/or accelerator portions 145 (see FIG. 1B) via interconnect 131.

Caching agent 125 can also interact with cache 135 and DCR 130. Caching agent 125 can read from and/or write to cache 135. Additionally, caching agent 125 can modify a data entry stored at DCR 130, including the address 201, status 202, and/or data value 203 of the data entry for DCR 130. In particular, caching agent 125 can replace "out-of-date" data stored at DCR 130 with up-to-date data received from CCI 110. Caching agent 125 can change the status 202 of a data entry to be any one of three states, including "valid," "out-of-date," and "invalid."

Further, caching agent 125 can store the address 201 for a data entry stored at DCR 130. The address 201 corresponds to the physical address in memory 155 where a copy of the data value 203 currently resides for an up-to-date value 203. Alternatively, the address 201 may correspond to the physical address in memory 155 where a copy of the data value 203 currently resides, or previously resided for an "out-of-date" value 203. In other embodiments, caching agent 125 may have more, fewer, and/or different capabilities than those described above.

Caching agent 125 may be implemented by an accelerator 140, as shown in FIG. 1B. Alternatively, caching agent 125 may be implemented by other hardware, such as a different accelerator, or different hardware.

Cache 135 may be a local cache available to the caching agent 125 and/or accelerator 140 as a quicker alternative for reading and/or writing data than a memory, such as memory 155. Alternatively, cache 135 may be used by other hardware and/or software. Cache 135 is part of caching agent 125, which is connected to CCI 110. CCI 110 provides that data that is read from and/or written to cache 135 is cache coherent with respect to other data storage devices (e.g., memory 155, caches 105A-G, DCR 130). In some embodiments, DCR 130 is separate from cache 135, whereas in other embodiments, DCR 130 is a subset of cache 135. In some embodiments, environments 100 and 150 may not include cache 135. Alternatively, environments 100 and 150 may include multiple caches 135. While the displayed embodiment of FIG. 1B shows cache 135 as part of accelerator 140, in other embodiments (e.g., FIG. 1A), cache 135 may be separate from accelerator 140.

FIG. 2 displays an example DCR 130. DCR 130 may include one or more data entries. Each data entry includes several fields, including an address 201, a status 202, and a data value 203. DCR 130 also includes an enable field 204 and a DCR logic module 205. The DCR 130 may include a memory or other type of non-transitory data storage that is configured to store the data entries and the enable field 204. The non-transitory data storage of DCR 130 may also be configured to store logic module 205, for example, in the form of executable instructions. In some embodiments, the logic module 205 may include circuitry, such as one or more hardware logic elements, that cause DCR 130 to perform one or more operations of the method (see FIG. 3) for low latency communication between one or more CPUs and one or more accelerators. In some embodiments, the logic module 205 circuitry may include a processor to execute one or more instructions to perform one or more operations of the method for low latency CPU accelerator communication (see FIG. 3).

Address 201 describes the physical address in memory 155 where a copy of the data value is stored. The address 201 could be modified at DCR 130 to change the data value 203 that is monitored. The address 201 may be modified by DCR 130. However, in other embodiments, software, such as caching agent 125, or other software, could modify the address 201 of DCR 130.

Data value 203 provides the data value for the particular data entry. The data value 203 could be any type of value that is relevant to the accelerator 140 (or accelerator portion 145), such as control information, notifications, a request to perform a computation, a command queue pointer, or some other relevant information. For the command queue pointer example, if the CPU updates the command queue pointer data value from "7" to "9" at memory 155, then an up-todate copy of the data stored at DCR 130 would have a data value 203 of "9." Further, the out-of-date copy of the data that was stored at DCR 130 may have a data value 203 of "7," in some embodiments.

Enable 204 can be used to determine whether DCR 130 is disabled. When DCR 130 is enabled, DCR 130 attempts to continuously be in a cache state of "shared." This state indicates that the data in DCR 130 is up-to-date and usable by hardware receiving data from DCR 130, such as accelerator 140 and/or accelerator portion 145. When the DCR 130 is not in the shared state, the DCR 130 may immediately send a "read to share" request on CCI 110 to obtain an up-to-date copy of the data. For example, after the CPU updates a copy of the shared data and sends an "invalidate" request to DCR 130 via CCI 110, DCR 130 sends a "read to share" request on CCI 110 after marking the data with the status 202 of "out of date." Although not required, in some embodiments, DCR 130 may also inform accelerator 140 and/or accelerator portion 145 that the data value 203 now has a status 202 of "out of date."

DCR 130 may also include DCR logic module 205. Module 205 may include instructions that when executed allow the DCR 130 to execute the method (see FIG. 3) for low latency communication between one or more CPUs and one or more accelerators. While module 205 is displayed in FIGS. 1A and 1B as residing within DCR 130, in other embodiments, the instructions of module 205 may reside in other hardware. Additionally, other software, such as caching agent 125, or other software, may execute one or more of the steps of module 205.

In response to the request, the CCI 110 will then fetch the most up-to-date data and pass it to the DCR 130. When the DCR 130 receives the up-to-date data from CCI 110, the DCR 130 may replace the out-of-date data with the received up-to-date data from CCI 110. The DCR 130 may then mark the received up-to-date data to have a status 202 of "valid." Although not required, in some embodiments, DCR 130 may also inform accelerator 140 and/or accelerator portion 145 that the data value 203 now has a status 202 of "valid." In some embodiments, if the received data is no longer "valid" (e.g., the CPU updates a copy of the data at memory 155), then DCR 130 marks the status 202 of the received data as "out-of-date."

The status 202 can represent three different possible DCR interface states. The three DCR states are "invalid," "out-of-date," and "valid." Data that is "out-of-date" may be "valid" data that has been recently updated. The status 202 may be "invalid" when the data entry doesn't have a data value 203. The three DCR interface states may correspond to cache states. In one embodiment, the DCR interface state of "valid" corresponds to the cache state of "shared," the DCR state of "invalid" corresponds to the cache state "invalid" for out-of-date cache data that hasn't been shared, and the DCR state of "out-of-date" corresponds to the cache state of "invalid" for cache data that has been shared. In other embodiments, more, fewer, and/or different DCR states may be used. Additionally, DCR states may correspond to the cache states in a different manner than the manner described above.

In the displayed embodiment, DCR 130 stores data values received by caching agent 125 via CCI 110. However, in other embodiments, DCR 130 may store data values from other sources, such as cache 135. Additionally, DCR 130 provides data to other components via DCR bus 133. In FIG. 1A, DCR 130 provides data to accelerator 140 via DCR bus 133, while in FIG. 1B, DCR 130 provides data to accelerator portion 145 via DCR bus 133. The data provided by DCR 130 to a hardware accelerator includes the data value 203 and a status 202 for a particular data entry stored at DCR 130. In the displayed embodiments of FIGS. 1A and 1B, address 201 is not provided by DCR 130 to accelerator 140 or accelerator portion 145. However, in other embodiments, the DCR 130 can provide address 201 to other components, such as accelerator 140 and accelerator portion 145.

In some embodiments, the shared data stored at DCR 130 may have one or more copies stored at other memories, including memory 155, and/or one or more of caches 105A-G. Alternatively, the shared data stored at DCR 130 may only have one copy stored at DCR 130, as opposed to multiple copies stored at various memories. For example, DCR 130 may receive up-to-date data from CCI 110 and mark the up-to-date data as "valid." The up-to-date data may have been stored at cache 105A. However, CPU core 101 may evict the stored up-to-date data from cache 105A. As a result, only one copy of the "valid" up-to-date shared data would be stored at DCR 130. Thus, although the data stored at DCR 130 is referred to as shared data, it is possible that the copy of shared data at DCR 130 is the only copy of the shared data in the system.

While FIGS. 1A and 1B display the caching agent 125 with only one DCR 130, in other embodiments, caching agent 125 may include multiple DCRs 130. Also, while the displayed embodiments only show a DCR 130 communicating with one hardware accelerator 140 or accelerator portion 145, in other embodiments, the DCR 130 can communicate with multiple hardware accelerators, accelerator portions, other devices, and/or a combination of devices and device portions. Also, in some embodiments, DCR 130 may receive data from software different from caching agent 125 and hardware different from CCI 110.

While FIGS. 1-2 display DCR 130 as the structure used to track the address 201 and status 202 for data values 203 to enable the low latency CPU accelerator communication method to work, different structures could be used to track the address 201 and status 202 for data values 203. For example, software can be used to change the address 201 monitored by DCR 130. For the command queue pointer example, if software modified the address 201 for DCR 130, this may be a way to have DCR 130 monitor a different command queue pointer. Additionally, software could also monitor the status 202 of the data values 203. Other structures may also be possible for tracking address 201 and status 202 to enable the low latency communication method.

The interconnect 131 is used to transmit data between caching agent 125 and hardware, such as hardware accelerator 140, and/or accelerator portion 145. In some embodiments, the interconnect 131 may also include a specific type of interconnect 133, such as the DCR bus. The DCR bus 133 communicates data between the DCR 130 and accelerator 140 and/or accelerator portion 145. While FIGS. 1A and 1B display interconnect 131 and DCR bus 133 providing data communication between accelerators 140, 141 or accelerator portion 145 and the caching agent 125, the cache 135, or DCR 130, other components may be used to provide communication between the caching agent 125, the cache 135, DCR 130, and accelerators 140, 141, and/or accelerator portion 145.

One benefit of the DCR bus 133 is that the accelerator does not have to send a request to DCR 130 or caching agent 125 to view "valid" or "out-of-date" data values 203. Rather, the data values 203 of DCR 130, along with the status 202, are generally available to the accelerator 140 and accelerator portion 145 without a request. In particular, the accelerator 140 and accelerator portion 145 no longer have to send a request for up-to-date data and wait for the data request to be fulfilled. Instead, the accelerator 140 and accelerator portion 145 view the data value 203 and status 202 on the DCR bus 133 and then determine how to proceed. Because no requests are required, latency of the communication is reduced.

FIG. 1A displays accelerators 140 and 141. The hardware accelerator 140 is a hardware unit designed to execute one or more specific tasks or function. The accelerator task could be any one of a number of different tasks, including compression, encryption, hashing, graphic processing, and/or other tasks. The task may be allocated to the accelerator by the CPU. Although the CPU may be able to execute the assigned tasks or functions, the accelerator may be designed to execute the task faster than the CPU, which in turn improves CPU performance. Additionally, because the accelerator executes the task, the CPU is freed up to execute other tasks, which also improves CPU performance. For the disclosed method, the accelerator 140 (as well as accelerator 141) may retrieve data it uses from caching agent 125 and/or the DCR 130 to execute a task.

FIG. 1A shows that multiple accelerators can interact with caching agent 125 to retrieve data from caching agent 125. Additionally, FIG. 1A shows that an accelerator 140 can interact with DCR 130 while a different accelerator 141 interacts with a different portion of caching agent 125. When interacting with a DCR 130, the accelerator 140 can retrieve data from the DCR 130 via the DCR bus 133. When interacting with caching agent 125, the accelerator 140 can communicate with the caching agent 125 via interconnect 131.

FIG. 1B shows accelerator 140 including both the caching agent 125 and a computational portion of the accelerator 145. In the embodiment displayed in FIG. 1B, the caching agent 125 provides data to the computational portion of the accelerator 145. The computational portion of the accelerator 145 executes the task and/or function that accelerator 140 is designed to execute (e.g., compression, encryption, hashing, graphic processing, or a different task). When interacting with a DCR 130, the accelerator portion 145 can retrieve data from the DCR 130 via the DCR bus 133. When interacting with caching agent 125, the accelerator portion 145 can communicate with caching agent 125 via interconnect 131.

When interacting with DCR 130 via DCR bus 133, the accelerator 140 and accelerator portion 145 only receive data with the status 202 of "valid" or "out-of-date." In some embodiments, the accelerator 140 and/or accelerator portion 145 may determine a policy for whether or not the accelerator obtains "out-of-date" data values and/or "valid" data values. In one embodiment, the accelerator 140 (and/or accelerator portion 145) only retrieves data from DCR 130 if the data has a status 202 of "valid." In other embodiments, the accelerator 140 (and/or accelerator portion 145) always retrieves the first data available at DCR 130, regardless of the status 202 being "valid" or "out-of-date."

In some embodiments, the accelerator 140 (and/or accelerator portion 145) will vary whether it retrieves "out-of-date" data or waits for "valid" data based on the specific task or function being performed by the accelerator 140 (and/or accelerator portion 145). In some embodiments, the accelerator 140 (and/or accelerator portion 145) will retrieve the "out-of-date" data after a time threshold has been exceeded. Other policies may also be possible. In some embodiments, other hardware (e.g., the CPU) determines whether or not the accelerator 140 (and/or accelerator portion 145) obtains "out-of-date" data from DCR 130.

In some embodiments, caching agent 125 includes multiple DCRs 130. In some embodiments, an accelerator 140 and/or an accelerator portion 145 receives data from multiple DCRs 130. In some embodiments, the multiple DCRs 130 provide data to multiple accelerators 140, 141 and/or multiple accelerators portions 145. Other configurations of DCR and accelerator communication may also be possible.

The disclosed system and method for lower latency and higher bandwidth communication between a CPU and an accelerator is applicable to computing devices relying on accelerators to improve CPU and computing device performance. The applicable computing devices may be networked computing devices, such as servers and/or client devices. The applicable computing device may be used in a variety of applications. For example, a self-driving vehicle application may rely on the disclosed system and method to improve CPU and computing device performance for one or more computing devices. However, other applications are also possible.

III. COMMAND QUEUE POINTER EXAMPLE

Using the aforementioned command queue pointer example, the systems displayed in FIGS. 1A and 1B provide a low latency and higher bandwidth communication between CPUs and accelerators that includes the following steps. First, when updating data at memory 155, the CPU via one of its CPU cores 101, 102, and 103 sends an "invalidate" request to CCI 110. The CPU via one of its CPU cores 101, 102, 103 updates data via CCI 110 by writing to an address of memory 155, which may later be used for address 201 at DCR 130.

In particular, the memory 155 may have a command queue pointer value of "7" stored at address "100." The CPU may update the command queue pointer value from "7" to "9" by sending a write command to CCI 110. CCI 110 then writes the value "9" to address "100" of memory 155 to update the command queue pointer value from "7" to "9".

Next, CCI 110 transmits an "invalidate" request to the caching agent 125. The caching agent 125 provides the "invalidate" request to an enabled DCR 130, which in turn marks the data entry status 202 as "out-of-date." In this example, DCR 130 may store a command queue pointer value 203 of "7." Upon receiving the "invalidate" signal, DCR 130 sends a "read to share" request to CCI 110 to obtain the most up-to-date copy of the data. CCI 110 then fetches an up-to-date copy of the data and passes it back to DCR 130. In some embodiments, CCI 110 may grab the data from caches 105A-G, memory 155, or some other data storage device.

Eventually, CCI 110 responds to the "read to share" request by providing an up-to-date value to the caching agent 125. The data from CCI 110 is cache coherent relative to other caches and/or memories, such as caches 105A-G, 135, DCR 130, memory 155, and other data storage devices that are connected to CCI 110. The caching agent 125 updates DCR 130 by replacing the out-of-date value 203 of "7" with the up-to-date value 203 of "9." When the caching agent 125 replaces the data value 203 with the value of "9," the caching agent 125 overwrites the address 201 of DCR 130 to equal the corresponding physical address of memory 155, which is "100." Also, the caching agent 125 overwrites the status 202 of the data entry for DCR 130 to state "valid" because the data is up-to-date.

A copy of the shared data in the DCR 130 may then be provided to an accelerator 140 and accelerator portion 145 via the DCR bus 133. The accelerator 140 or accelerator portion 145 can receive data value 203 and data status 202 from the DCR 130 via DCR bus 133. Thus, in this example, accelerator 140 (or accelerator portion 145) receives the "valid" data value 203 of "9". In some embodiments, the method for communicating data between accelerators and CPUs may involve fewer, more, and/or different steps than those described above.

IV. EXAMPLE METHOD

Figure 3:
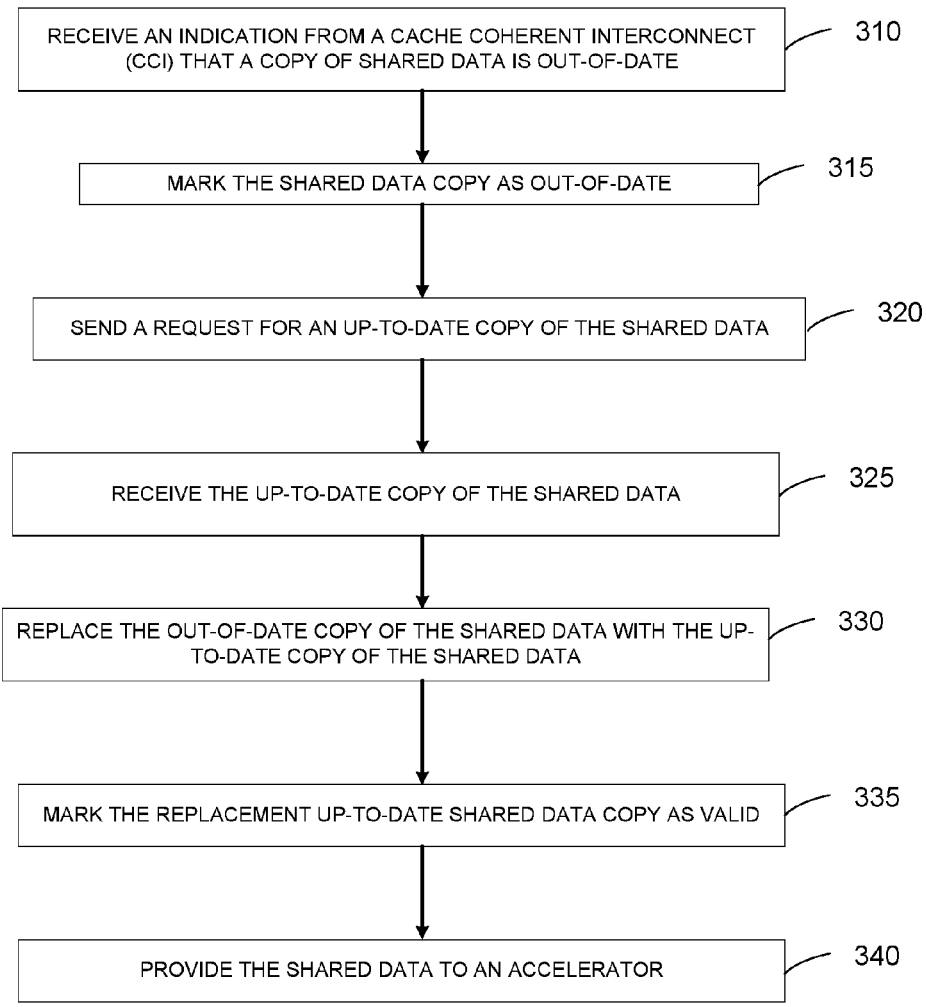
FIG. 3 is a flow chart depicting the steps of an example low latency CPU accelerator communication method.

FIG. 3 is a flow chart illustrating an example method 300 for low latency communication between a CPU and an accelerator. Method 300 begins with receiving an indication from a CCI that a copy of shared data is out-of-date, as indicated by block 310. For example, with reference to FIG. 1A, CCI 110 may receive an "invalidate" command from a CPU via CPU cores 101, 102, and/or 103. The "invalidate" command may then be forwarded to caching agent 125 and DCR 130. The "invalidate" command may be sent by the CPU when the CPU updates a data value at memory 155. Thus, DCR 130 receives via CCI 110 the "invalidate" command that originated with the CPU for CPU cores 101, 102, and 103 that a copy of shared data at DCR 130 is out-of-date.

After receiving the indication, method 300 progresses to mark the shared data copy as "out-of-date," as shown by block 315. For example, in FIG. 1A, when DCR 130 receives the "invalidate" command, DCR 130 responds by changing the status 202 for data value 203 to "out-of-date." Once the shared data copy has been marked as "out-of-date," method 300 responds by sending a request for an up-to-date copy of the shared data, as can be seen by block 320. Referring back to FIG. 1A, DCR 130 sends a "read to share" command to CCI 110 after receiving an "invalidate" command to obtain an up-to-date copy of the shared data at DCR 130.

Once the request is sent, method 300 continues by receiving the up-to-date copy of the shared data, as shown in block 325 of FIG. 3. For example, in FIG. 1A, in response to the "read to share" request, CCI 110 retrieves an up-to-date copy of the shared data and forwards it to caching agent 125 and DCR 130. Thus, DCR 130 receives the up-to-date copy of the shared data from CCI 110. Once the up-to-date copy of the shared data is received, method 300 progresses by replacing the out-of-date copy of the shared data with the up-to-date copy of the shared data, as shown in block 330. In particular, in FIG. 1A, DCR 130 replaces the out-of-date shared data with the up-to-date shared data received from CCI 110 in response to the "read to share" request.

Method 300 continues by marking the replacement up-to-date shared data copy as valid, as shown in block 335. For example, in FIG. 1A, once DCR 130 has replaced the out-of-date copy of the shared data with the up-to-date copy of the shared data, DCR 130 then marks the replacement up-to-date shared data copy with a status 202 of "valid." The method 300 then continues by providing the shared data to an accelerator, as seen in block 340 of FIG. 3. For example, in FIG. 1A, accelerator 140 may receive data from DCR 130 with a status 202 of either "out-of-date" or "valid." Thus, the DCR 130 can provide the shared data to an accelerator 140 when the data is up-to-date or out-of-date.

Although FIG. 3 displays several steps for method 300, in some embodiments, method 300 may include more, fewer, and/or different steps than those displayed in FIG. 3. For example, the method 300 may include additional steps regarding the type of shared data to provide to the accelerator. In particular, method 300 could include a step to provide an up-to-date copy of the shared data to the accelerator, or a step to provide an out-of-date copy of the shared data to the accelerator. Additionally, the method 300 may clarify that the accelerator determines the policy for whether or not an out-of-date copy of the shared data is provided to the accelerator. Further, the steps for method 300 may be performed in a different order than the order displayed in FIG. 3.

The method 300 is executed by module 205 of DCR 130, in one embodiment. In other embodiments, the method 300 may be executed by a combination of accelerators, processors, and/or other hardware. In some embodiments, the method 300 relies on a caching agent to execute one or more of the steps of method 300. Alternatively, the method 300 could be executed by other software. In some embodiments, different hardware and/or software may execute the steps of method 300.

V. CONCLUSION

While the methods described herein illustrate a number of blocks that are in a sequential order, these blocks may also be performed in parallel or in a different order than those described herein. Also, the various blocks may be combined into fewer blocks, or divided into additional blocks. In addition, it should be understood that the flow diagrams show functionality and operation of possible implementations of the present embodiments, though other implementations are also possible. Moreover, each block in the flow diagrams may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:
1. A method comprising:
receiving, by a dedicated cache register (DCR), an indication from a cache coherent interconnect (CCI) that a copy of shared data at the DCR is out-of-date;
marking, by the DCR, the shared data copy at the DCR as out-of-date;
sending, by the DCR, a request for an up-to-date copy of the shared data;
receiving, by the DCR, the up-to-date copy of the shared data;

replacing, by the DCR, the out-of-date copy of the shared data at the DCR with the up-to-date copy of the shared data at the DCR;

marking, by the DCR, the replacement up-to-date shared data copy at the DCR as valid; and providing, by the DCR, the shared data to an accelerator.

2. The method of claim 1, wherein the shared data includes one or more data entries, wherein each data entry has a corresponding data value and data state.

3. The method of claim 2, wherein the data state can be selected from the group consisting of valid, invalid, and out-of-date, wherein only data entries with the data state of out-of date or valid are provided to the accelerator.

4. The method of claim 1 further comprising:

informing the accelerator that the shared data copy is valid after the replacement up-to-date shared data copy is marked valid.

5. The method of claim 4 further comprising:

informing the accelerator that the shared data copy is out-of-date after marking the shared data copy as out-of-date.

6. The method of claim 5 further comprising:

providing the out-of-date copy of the shared data to the accelerator prior to replacing the out-of-date copy of the shared data with the up-to-date copy of the shared data.

7. The method of claim 1, wherein the indication that the copy of shared data is out-of-date is originated by a central processing unit (CPU).

8. The method of claim 1, wherein the accelerator specifies a policy about receiving out-of-date shared data.

9. A system comprising:

a central processing unit (CPU) configured to generate an indication that a copy of shared data is out-of-date;

a cache coherent interconnect (CCI) configured to receive the indication;

an accelerator; and a dedicated cache register (DCR), the DCR comprising:

a non-transitory data storage configured to store instructions and the copy of the shared data; and a processor, wherein the instructions are executable by the processor to cause the DCR to perform operations comprising:

receiving the indication from the CCI that the copy of shared data is out-of-date;

marking the shared data copy as out-of-date;

sending a request for an up-to-date copy of the shared data;

receiving the up-to-date copy of the shared data;

replacing the out-of-date copy of the shared data with the up-to-date copy of the shared data;

marking the replacement up-to-date shared data copy as valid; and providing the shared data to the accelerator.

10. The system of claim 9, wherein the shared data includes one or more data entries, wherein each data entry has a corresponding data value and data state.

11. The system of claim 10, wherein the data state can be selected from the group consisting of valid, invalid, and out-of-date, wherein only data entries with the data state of out-of date or valid are provided to the accelerator.

12. The system of claim 9, wherein the operations further comprise:

informing the accelerator that the shared data copy is out-of-date after marking the shared data copy as out-of-date; and informing the accelerator that the shared data copy is valid after the replacement up-to-date shared data copy is marked valid.

13. The system of claim 9, wherein the accelerator specifies a policy about receiving out-of-date shared data.

14. A dedicated cache register (DCR) comprising:

a processor;

non-transitory data storage, wherein the non-transitory data storage stores:

shared data; and instructions that when executed by the processor cause the DCR to perform operations comprising:

determining that the shared data is out-of-date;

retrieving up-to-date shared data; and providing the up-to-date shared data to an accelerator.

15. The DCR of claim 14, wherein determining that the shared data is out-of-date comprises:

receiving an indication from a cache coherent interconnect (CCI) that the shared data is out-of-date.

16. The DCR of claim 14, wherein the operations further comprise:

marking the shared data as out-of-date.

17. The DCR of claim 14, wherein retrieving up-to-date shared data comprises:

sending a request for an up-to-date copy of the shared data; and receiving the up-to-date copy of the shared data.

18. The DCR of claim 14, wherein the operations further comprise:

replacing the out-of-date shared data with the up-to-date shared data.

19. The DRC of claim 14, wherein the operations further comprise:

marking the up-to-date shared data as valid.

20. The DRC of claim 14, wherein the shared data includes one or more data entries, wherein each data entry has a corresponding data value and a data state.

21. The DRC of claim 20, wherein the data state can be selected from the group consisting of valid, invalid, and out-of-date.

* * * * *